T. J. LOVETT.
ORE TREATING PROCESS.
APPLICATION FILED NOV. 14, 1912.
1,071,763.
Patented Sept. 2, 1913.
2 SHEETS—SHEET 1.
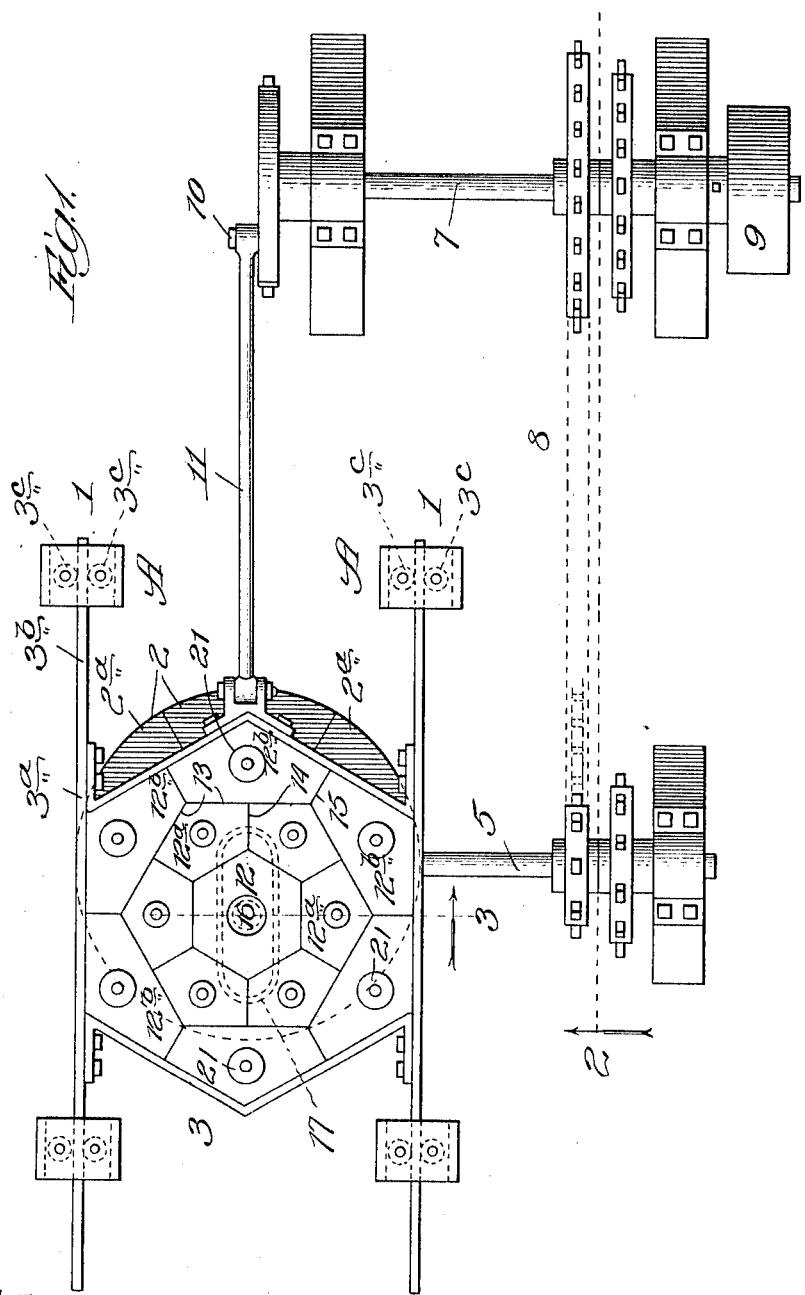
Witnesses:
Inventor:
Thomas J. Lovett,

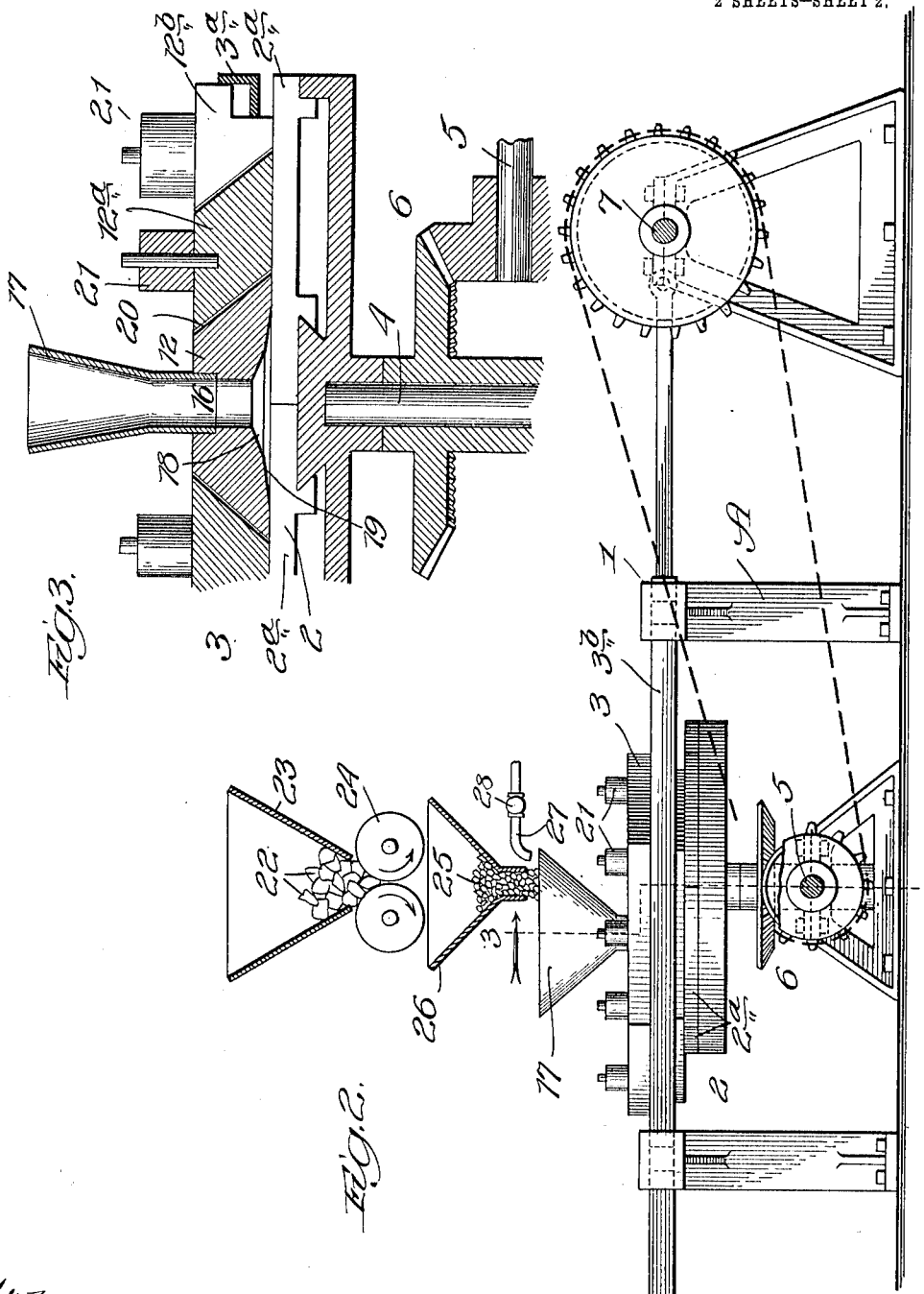

UNITED STATES PATENT OFFICE.

THOMAS J. LOVETT, OF CHICAGO, ILLINOIS, ASSIGNOR TO COPPER PROCESS COMPANY, OF CHICAGO, ILLINOIS, A CORPORATION OF SOUTH DAKOTA.

ORE-TREATING PROCESS.

1,071,763.

Specification of Letters Patent.

Patented Sept. 2, 1913.

Application filed November 14, 1912. Serial No. 731,454.

*To all whom it may concern:*

Be it known that I, THOMAS J. LOVETT, a citizen of the United States, residing at Chicago, in the county of Cook and State of Illinois, have invented a new and useful Improvement in Ore-Treating Processes, of which the following is a specification.

My invention relates particularly to a process for the recovery of native metals contained in fine, flaky particles in metal-bearing rock.

My present process is especially valuable as meeting the requirements for saving, in the most economical manner, the native copper which is present mainly in the form of fine, light particles in copper-bearing rock, of which there are known to exist in the United States vast deposits, which, as experience has demonstrated at the cost of large expenditures, cannot be economically saved by standard processes and machinery.

It may be explained that ores of the character here referred to exist extensively as a conglomerate sandstone, containing free native copper mostly in the form of fine, flaky particles. The copper content may fall as low as 1 per cent., or even lower, from which it follows that in the absence of an economical process for effecting recovery of the metal, such ores cannot be treated profitably.

In my Patent No. 679,901, dated August 6, 1901, I described and claimed a process whereby the fine, flaky particles of copper might be converted into pellet-form or slug-form, so as to be readily concentratable; and in my Patent No. 979,180, granted December 20, 1910, I described and claimed an improvement on said process, whereby a higher percentage of the mineral content of the ore might be recovered in the form of a higher grade concentrate. My present process constitutes an improvement on the process set forth and claimed in my said Patent No. 979,180.

In accordance with my present invention, I take the metal-bearing ore in the form of lumps which hold the fine particles of metal in their unfreed, rocky environment, or matrix; and I roll the ore in this condition between extended surfaces, under pressure, preferably in the presence of water and in ever-changing direction, whereby the rock-lumps are subjected to a triturating and crumbling action and the flaky metal particles are simultaneously therewith rolled and twisted and massed into pellets, rolls, or slugs. In this process, the rock-lumps are subject to the crushing and triturating action of the plates between which the rolling is effected, are also subject to mutual attrition by action upon each other, and the finer lumps of gangue are subject to the attrition caused by the rolling action of the myriads of small metal pellets which are formed. In turn, the gangue aids in effecting the rolling and twisting of the metal particles, which otherwise would have a tendency to slip or skid, but, finally, in the presence of the water employed, becomes so softened and reduced as to be practically all expressed from the copper pellets, thus leaving a high grade concentrate. Practical tests with a full-size machine of large capacity have demonstrated that it is possible, in the practice of this process, to treat lump ore in the manner which will be hereinafter described more at length, and economically save a high per cent. (from 80 per cent. to over 90 per cent. so far as the tests have shown) of the metal content of the ore in the form of a high-grade concentrate (exceeding, if desired, 75 per cent. pure metal).

The process may be practised by means of any machine adapted to the purpose of reducing the ore-lumps in which the fine metal particles are held (unfreed) in their natural rocky environment, or matrix, and simultaneously therewith rolling the metal particles as they are thus freed from the conglomerate into pellets or slugs, in which form they are readily recoverable as concentrates.

In the accompanying drawing, I illustrate a rock-pulverizing, concentrate-preparing apparatus of simple form adapted to the practice of the improved process and which will serve to facilitate an explanation of the process.

In the drawings—Figure 1 represents a plan view of a machine adapted to the practice of my improved process; Fig. 2, a sectional elevational view taken as indicated at line 2 of Fig. 1, this view showing, in section, the ore hoppers employed; and Fig. 3, an enlarged broken section taken as indicated at line 3 of Fig. 1.

The machine illustrated comprises a frame A equipped with guides 1; a rotary disk 2 having a substantially flat top surface; and a reciprocating member 3 having a substantially flat lower surface which coacts with the upper surface of the disk 2. In the illustration given, the disk 2 is rotated through the medium of a vertical shaft 4 and a horizontal shaft 5, which are connected by bevel-gears 6. The shaft 4 is operated from a horizontal shaft 7 through the medium of sprocket-chain connections 8 which may be changed at will to vary the rate of rotation of the shaft 4. Power is communicated to the shaft 7 by a pulley 9. The shaft 7 is equipped with an adjustable crank or wristpin 10 which is connected, by a pitman 11, to the reciprocable member 3. The disk 2 is shown provided with removable sectors or triangular plates 2ª which form the wearing surface of the disk.

The member 3 comprises a frame 3ª having extensions 3ᵇ confined laterally by rollers 3ᶜ with which the bearings 1 are equipped. The frame 3ª is preferably made of hexagonal form within which are confined a plurality of floating plate-sections 12, 12ª, 12ᵇ. The central or inner section 12 has a periphery of hexagonal form. The sections 12ª are six in number, corresponding with the six edges of the central member 12, and when the members 12ª are grouped about the member 12, their outer edges form a hexagonal perimeter 13. The members 12ᵇ are six in number and encircle the members 12ª, the outer edges of the members 12ᵇ forming a hexagonal perimeter which fits freely within the hexagonal frame 3ª. It will be noted that the arrangement of the plate-sections is such that the joints 14 between the sections 12ª are staggered with relation to the joints 15 between the sections 12ᵇ. The purpose is to prevent the materials which are being treated from following the lines of the joints and so escaping from the machine before being subjected to the desired amount of rolling action under pressure between the members 2 and 3. The member 3 is preferably of sufficient size to wholly cover the disk 2 when the axes of said members are coincident, at which time the corner portions of the member 3 will overhang or project beyond the periphery of the disk 2.

The central section 12 of the upper member 3 is provided with a central opening 16 to which is fitted a hopper 17 which may be of the elongated form indicated by dotted lines in Fig. 1. At the lower end of the perforation 16 the opening is given a wide flare as indicated at 18; and the material is further cut away or chamfered, as indicated at 19, giving a still wider flare to the opening or orifice at the lower surface of the member 12. The meeting edges of the sections 12, 12ª and 12ᵇ are inclined downwardly and outwardly, and separated by slight spaces, as indicated at 20, giving freedom of movement to the floating sections constituting the member 3. Weights 21 are added to the sections mentioned, according to the conditions under which the machine is operating, the character of the ore being treated, etc. These weights may vary in size, it being preferred to give to the outer sections of the member 3 a larger weight per square inch than is given to the intermediate sections.

After the ore is taken from the mine in the form of large lumps, it is passed through a jaw-crusher, or other suitable crusher, to reduce the lumps in size and give them some uniformity. The lumps 22 in this condition will be fed through a hopper or chute 23 and between rolls 24, thus producing smaller lumps 25 of still more uniform size. The lumps 25 may drop into a hopper 26 from which they pass to the elongated hopper 17 which reciprocates with the member 3. The lumps 25 may be of any desired size, depending upon the degree of hardness of the ore being treated. The object is to lighten the work upon the gangue-pulverizing and concentrate-preparing machine, while still keeping the ore in a form in which the fine particles of copper, for instance, are still held in their rocky environment or matrix. In other words, it is desired to feed the ore lumps holding the fine metal particles in unfreed condition or in a matrix between the members 2 and 3, by which the ore lumps will be rolled between extended surfaces under pressure and subjected to a gradual reduction in size, during which operation the gangue will be reduced to a finely pulverulent condition and the metal particles will at the same time be compressed and rolled together to form slugs, pellets, and rodlets of readily concentratable character. As the ore lumps are fed through the machine, water is at the same time introduced through the hopper 17. This may be supplied from a pipe 27, controlled by a valve 28. The water introduced tends to soften the gangue and permit the matrix to be gradually broken down, and in the end the gangue is reduced to a fine powder, approaching a slime, while the metal particles are rolled together or agglomerated, thus producing a concentrate of granulated form, which is readily separable, by any approved method, from the light pulverulent gangue.

In the operation of the machine, the member 3 serves both as a pressure-member and as a distributing member which operates to spread the lumps over the rotating disk 2; and the rotation of the disk 2 produces a centrifugal force tending to move the lumps progressively toward the periphery of the disk 2. The operation is so controlled that before the material reaches the periphery of the disk 2 the gangue is reduced to a fine pulverulent form, preferably finer than 80 mesh, the metal particles are freed from the matrix and at the same time rolled into readily concentratable form; and finally the materials are discharged over the edge of the disk 2 and collected by any suitable device (not shown). Experience has demonstrated that it is possible, by practising this method, to free the fine metal particles almost wholly from the matrix and at the same time prepare them in the form of a granulated concentrate which will settle readily in water, thus enabling a very high saving to be effected. The granulated concentrates may vary in size from a very fine-grain concentrate (say as fine as 240 mesh) to a coarse-grain concentrate. That is to say, the concentrate produced may contain grains, slugs or pellets of all gradations in size, but always of granular or slug form, so as to be readily concentratable.

From the description given, it will be understood that the size of the ore lumps which are to be fed through the machine may vary within quite a wide range, but it is desirable to keep the lumps of such size that the fine copper is not released from the matrix previous to the concentrate-preparing treatment. Ordinarily, in dealing with copper-bearing conglomerate sandstone when it is taken from the mine, it is desirable, for the purpose of lessening the burden upon the concentrate-preparing machine, to preparatorily reduce the lumps to about the size of peas or wheat, in which condition the fine copper is still held in unfreed condition in the matrix.

One advantage of the present improved process is that the cost of milling is very greatly reduced, and at the same time the ore is always kept in such condition as to allow the lump-rolling process to be carried on to the best advantage, and the friable gangue to be reduced and gradually expressed or freed from the metal pellets. Thus, the improved process renders it possible to dispense with the use of expensive steam stamps, such as are now universally used for the treatment of this class of ores; and at the same time, the freeing of the fine metal particles in condition approaching slimes and in form which will cause the fine metal particles to be carried off in the tailings, is obviated. Practical tests indicate the possibility of reducing the milling cost to approximately 50 per cent., or possibly lower, of the cost by the standard methods now in use in this country. Practical tests also indicate the possibility of rendering unnecessary regrinding operations where the improved process is employed.

It is noteworthy, also, that the improved process herein described possesses the important advantage over all prior processes that it does not break the minute bonds or metal filaments which connect the fine copper scales when the process is practised on those sand stone ores where the copper impregnates the stone in arborescent or fine filigree-work form. In other words, in accordance with the present process, the fine metal filigree-work (observable under a microscope) in each ore-lump is gradually compressed or rolled together and the gangue gradually disintegrated and expressed from the metal pellet, thus avoiding the rupturing of the metal filaments which connect the metal scales, so that the production of separate fine scales is largely obviated, with consequent gain in facility of effecting saving of the metal. It is likewise true that in those ores where the metal particles are fine and unconnected they are nevertheless compacted together while held in the matrix, while the matrix is gradually reduced and the gangue is disintegrated and expressed from the metal slug or pellet. Gradual reduction of the ore while it holds the metal mainly in unfreed condition and co-incident massing of the metal, effected by prolonged rubbing and rolling under pressure, is a novel result of far-reaching advantages, both because it gives a concentrate which is more readily separated from the gangue with higher percentage of saving, and also because it renders it thoroughly practicable to dispense with the stamping operation as well as the regrinding operation of Huntington mills, pebble-mills, etc., from which it follows that the cost of installation, cost of maintenance and cost of milling operations are all very greatly reduced. The rolling action is that which results from the rubbing under pressure and the combined action may be appropriately termed a "rub-rolling action."

As has been indicated, the ratio between the rate of reciprocation of the member 3 and rotation of the member 2 may be varied by changing the sprocket connections 8; also, the throw or movement of the member 3 may be varied by adjusting the crank 10 with which the pitman 11 is connected.

It may be added that experience has demonstrated that the present process can be effectively practised by the use of machines possessing high capacity, economy of operation, and the greatest durability and longevity—all of the utmost importance with respect to a process capable of practical utilization in the saving of copper, where the average metal content may drop to 1 per cent. of the ore treated, from which it will be readily understood that it is necessary that a high percentage of the metal shall be saved at a low milling cost, or the mine cannot be profitably operated.

The foregoing detailed description has been given for clearness of understanding, and no unnecessary limitation should be understood therefrom.

What I regard as new, and desire to secure by Letters Patent, is—

1. The gradual reduction method of treating ore containing ductile metal in fine particles, which consists in subjecting ore-lumps holding the fine particles of metal mainly in unfreed condition to a prolonged rub-rolling action under pressure, to simultaneously disintegrate the gangue and roll the ductile metal particles into pellets or slugs.

2. The gradual reduction method of treating ore containing ductile metal in fine particles, which consists in subjecting ore-lumps holding the fine particles of metal mainly in unfreed condition to a prolonged rub-rolling action, in changing directions, under pressure, to simultaneously disintegrate the gangue and roll the ductile metal particles into readily concentratable pellet or slug form.

3. The gradual reduction method of preparing a concentrate, which consists in subjecting ore-lumps holding the metal values in the matrix to a prolonged rub-rolling action, in changing direction, under pressure, and in the presence of flowing water, said operation being continued until the gangue is reduced to finely pulverulent condition and the metal values rolled into readily concentratable slug or pellet form.

4. The method of treating ore which consists in rub-rolling ore for a prolonged period and under progressively increasing pressure until the mineral values are rolled into readily concentratable slug or pellet form.

5. The gradual reduction method of treating ore, which consists in subjecting ore-lumps holding the mineral values in unfreed condition to a prolonged rub-rolling action under progressively increasing pressure until the mineral values are freed from the matrix in readily concentratable form.

THOMAS J. LOVETT.

In presence of—
J. G. ANDERSON,
O. C. AVISUS.

Copies of this patent may be obtained for five cents each, by addressing the "Commissioner of Patents, Washington, D. C."